Figure 1:
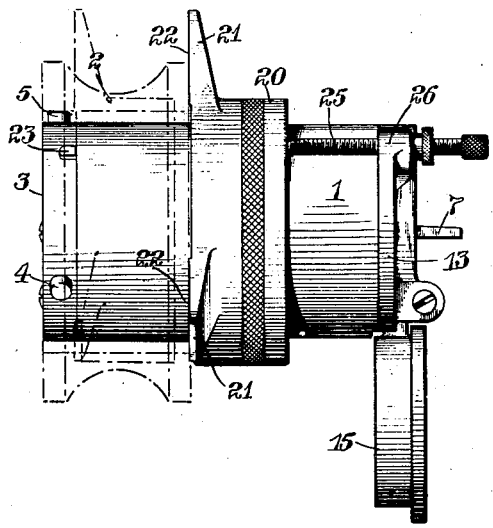

F. E. BRIGHT.
GAGE.
APPLICATION FILED MAR. 6, 1915.

1,206,202.

Patented Nov. 28, 1916.

Attest:
J. O. Mitchel
E. F. Hotchkiss.

Inventor:
F. E. Bright
by Rogers, Kennedy & Campbell Attys.

UNITED STATES PATENT OFFICE.

FRED E. BRIGHT, OF PHILADELPHIA, PENNSYLVANIA.

GAGE.

1,206,202.  Specification of Letters Patent.  Patented Nov. 28, 1916.

Application filed March 6, 1915. Serial No. 12,519.

*To all whom it may concern:*

Be it known that I, FRED E. BRIGHT, a citizen of the United States, residing at Philadelphia, in the county of Philadelphia and State of Pennsylvania, have invented certain new and useful Improvements in Gages, of which the following is a specification, reference being had therein to the accompanying drawing.

This invention relates to gages for use in determining as to the accuracy of surfaces, etc., and the invention is designed particularly for use in connection with the measurement and testing of interior surfaces, such for instance as the bores of the inner casing-members of antifriction bearings.

In the mounting of antifriction bearings on their supports, such as shafts and the like, great accuracy is required in the form and size of the bore of the inner casing-member, in order that the parts of the bearing will operate evenly and uniformly and without danger of binding or misalinement. In order to secure these results, the bore should be of true circular form throughout its longitudinal extent; the sides should be parallel throughout; the diameter should be of known predetermined size; and the ends of the casing member should extend in parallel planes disposed accurately at right angles to the axis of the casing member.

My improved gage is of a construction which particularly adapts it for use in effecting these measurements, and it comprises a body or support adapted to be inserted in the bore of the work, which body carries a laterally projecting positioning stop or stops, and a laterally projecting movable gage element, which stops and gage element are adapted to contact with the surface to be measured, an indicating mechanism being mounted on the body and being operatively connected with the movable gage element so as to be operated thereby, and a member being applied to the body and provided with a laterally extending bearing surface adapted to coöperate with the end of the work in squaring the gage therewith, and in effecting a given relation of the gage to the work.

A gage possessing the characteristics above outlined may be employed for measuring the diameter of the bore by positioning the same therein so that the positioning stops and gage element will contact with the internal surface. By turning the gage circumferentially within the bore, it may be determined if the bore is of true circular form; and by moving the gage longitudinally of the bore, it may be determined if the sides of the bore are in exact parallelism.

The gage is adapted to be employed in making comparisons of the measurements of a master piece or form, with the work piece under construction, the surrounding member on the body of the gage with the bearing surface coöperating with the end of the work, enabling the gage to be applied to the work with the positioning stops and gage element in the same relative position thereto, as they occupied in the master form.

In the accompanying drawings I have shown my invention in one form by way of example and embodying the features of construction above outlined. It is manifest, however, that the construction may be variously changed and modified by the skilled mechanic without departing from the spirit of my invention; and it will be understood that the invention is not limited to any particular form or construction of the parts except in so far as such limitations are specified in the claims.

Figure 4:
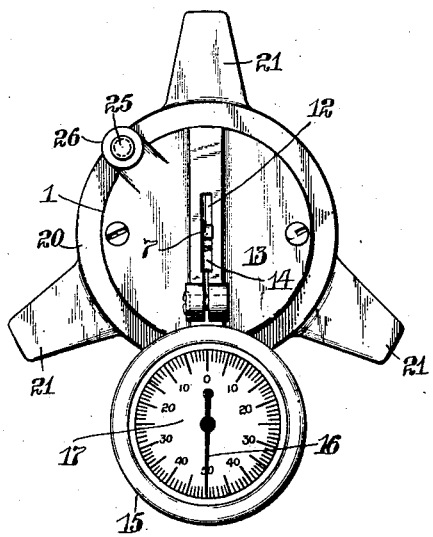
Figure 2:
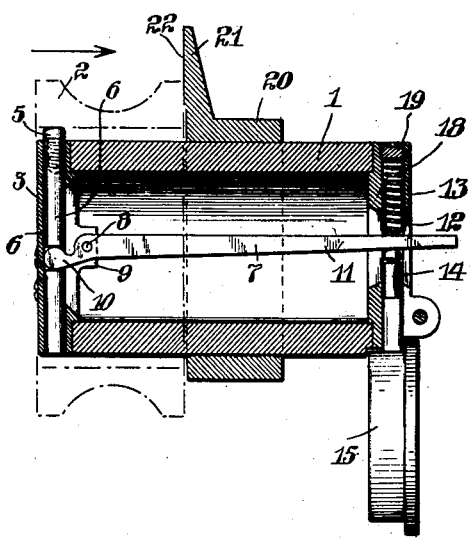
Figure 3:
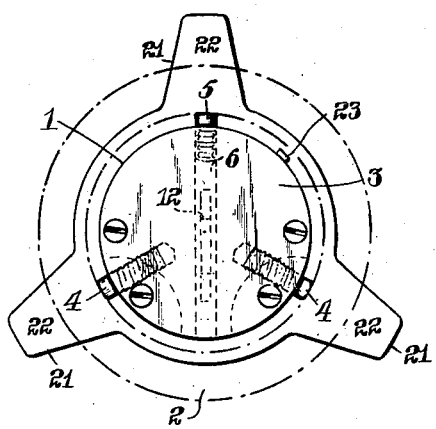

In the accompanying drawings, Figure 1 is a side elevation of my improved gage, showing the same applied in measuring the interior of the bore of the inner casing-member of an antifriction bearing. Fig. 2 is a longitudinal sectional elevation of the same. Fig. 3 is an end elevation looking in the direction of the arrow in Fig. 2. Fig. 4 is an elevation of the opposite end of the gage.

Referring to the drawings, my improved gage comprises a body or support 1, which is of hollow cylindrical form, and which is adapted to be applied in operative relation to the work to be measured, in the present instance it being shown as entered within the bore of an inner casing-member 2 of an antifriction bearing. At one end, the body has applied to it a cap 3, which is formed with two radially extending sockets in which are firmly seated, radially extending positioning stops in the form of pins 4, the outer ends of which project beyond the peripheral surface of the cap and body, so that they may be engaged with the surface to be measured. Coöperating with these positioning stops, is a gage element, in the form of a pin 5 which is seated firmly in a socket in the outer end of a slide 6, movably mounted in a radial guideway in the cap 3, the construction being such that the gage pin may be projected beyond the peripheral edge of the cap so as to contact with the surface to be measured, at a point between the points of contact of the positioning pins, the gage pin and positioning pins thus effecting a three-point contact with said surface. Extending longitudinally within the body 1, is an operating lever 7, which is pivoted near one end on a transverse axis 8, between ears 9 projecting inwardly from the cap, thus forming a short lever arm 10, and a long lever arm 11. The extremity of the short arm is formed with a head which is seated loosely in a socket in the slide 6, whereby the radial movements of the slide will swing the lever on its pivotal axis. The long arm of the lever extends through a radial slot 12 in a head 13 fixed firmly in that end of the body 1 opposite the cap 3. In the movements of the arm in the slot, it engages a plunger 14 constituting the actuating member of an indicating mechanism 15, which latter is sustained by the head 13 and projects laterally therefrom beyond the side of the body 1, the said indicating mechanism including a pointer 16 which is moved over a scale or dial 17, by the endwise movements of the actuating plunger 14. A compression spring 18 is sustained in a radial position by the head 13, and has its inner end bearing against the side of the long arm of the lever opposite where the latter engages the operating plunger 14, the outer end of which spring bears against a plug 19, screwed in the cap. This spring tends, through the medium of the operating lever 7 and the slide 6, to project the gage pin 5 outwardly and to maintain it yieldingly in an outward position, the radial movements of the slide and consequently the gage pin carried thereby, acting to swing the lever 7 transversely within the body 1, and effecting the movement of the operating plunger 14 and the consequent actuation of the indicating mechanism. Fitting snugly around the body 1, but movable longitudinally thereof, is a member in the form of a sleeve 20, which is provided with three laterally projecting flanges or arms 21 provided with flat bearing surfaces 22, which surfaces extend in a common plane disposed accurately at 90° to the longitudinal axis of the body. These bearing surfaces are adapted to coöperate with the ends of the work in squaring the gage therewith, as will be more fully described later on. The sleeve is limited in its longitudinal movements on the body, by means of a fixed stop lug 23 projecting from the body at the end of the same adjacent the cap 3, and by a longitudinally adjustable abutment at the opposite end of the body, in the form of a screw 25 which is threaded in a lug 26 projecting laterally from the head 13, and which screw is sustained exterior of the body longitudinally thereof. The inner end of the screw is adapted to engage the adjacent end of the sleeve 20, whereby the sleeve, by banking against the end of the screw may be supported at different positions lengthwise of the body, and may, by the turning of the screw, be adjusted thereon.

In the use of the gage for measuring the diameter of the bore, the end of the body 1 is inserted within the bore and the positioning pins and gage pin engaged with the interior surface thereof, and the reading of the scale of the indicating mechanism observed. In determining the accuracy of the circular form of the bore, the gage is turned around circumferentially therein, with the positioning pins and gage pin traversing the surface of the bore, in which operation, any deviation of the pointer of the indicating mechanism will show an inaccuracy in the contour. In determining as to the parallelism of the sides of the bore, the sleeve 21 is shifted along the body portion until the bearing surfaces thereon rest flatly against the end of the casing-member, and the sleeve being held in this position, the body of the gage is drawn longitudinally so as to cause the positioning pins and gage pin to traverse the surface of the bore in a like direction. Any deviation of the pointer of the indicating mechanism in this operation will show an inaccuracy in parallelism.

The provision of the sleeve 20 is of particular advantage in making a comparison of the surface of a master form, with the work under formation, in that it enables the gage to be accurately adjusted in the same relation to the work piece under formation, as it occupied in connection with the master form. Also it is of advantage in that it enables the positioning pins and gage pin to contact with the surface, at points contained in a plane disposed accurately at 90° with reference to the axis of the bore. This insures the utmost accuracy in the determination of the trueness of the surface and insures also the most effective comparison of measurements and contour with the surface of the master form.

In the use of the gage in this manner, to test, for instance, the diameter of the work at one end, the sleeve is so adjusted on the body of the gage, that when the bearing surfaces on the sleeve are engaged with the end of the master form, the positioning pins and gage pin will contact with the surface of the bore at one end of the latter. In this position of the gage relative to the master form, the reading of the indicating mechanism is noted. The gage is now applied to the work piece under treatment, and the bearing surfaces on the sleeve being engaged with the end of the work, the positioning pin and gage element will contact therewith in the same relative positions in a longitudinal direction, as they did in the master form. If the pointer of the indicating mechanism shows any change in the reading, it indicates a lack of correspondence in the two surfaces; whereas if the reading is the same, it shows the coincidence in the surfaces. In a like manner, a comparison may be made of different points in the length of the bore of the master form, with corresponding points in the work-piece under formation, and by this means an exact and accurate correspondence may be secured with the master form.

By reason of the form and construction of my improved gage it is adapted for use on the work while the latter is held in a chuck, lathe, or grinding machine; or it may be applied to the work independently of such support.

It will be understood that in the use of the gage in measuring for diameter and roundness, it is not necessary to move the body portion 1 relative to the sleeve 20, as the latter could be clamped in one position on the body, or made integral therewith.

It will be manifest to the skilled mechanic that the device is applicable also for the determination of the accuracy of surfaces other than the particular example shown, provided the operation is substantially as above indicated.

The positioning pins 4 are screwed into their sockets so that they may be adjusted radially of the gage. The gage pin 5 is screwed into its socket in the slide, whereby the pin is detachable and can be replaced by pins of different length. As a result of this arrangement of the positioning pins and gage pins, the gage is adapted for use in connection with work in which the diameter of the bore is greater than that shown, it being necessary in such cases to adjust the positioning stops outwardly and to substitute a longer gage pin for the one shown. The range of adjustment provided for in this manner may be as great as the radial extent of the bearing surfaces 22, which latter, on account of their transverse right angular disposition, will support the gage in proper relation to the work, although the bore in the latter may vary in size within wide limits.

Having thus described my invention, what I claim is:

1. In a gage, the combination of a frame or support, fixed laterally projecting positioning stops carried thereby, a laterally projecting yielding gage element mounted on the support, an indicating mechanism sustained by the support, means operated by the yielding gage element for operating said indicating mechanism, and a member sustained by the support and provided with a laterally extending bearing surface at right angles to the axis of the support and adapted to bear flatly against the end of the work to square the gage with the work.

2. In a gage, the combination of a frame or support, fixed laterally projecting positioning stops carried thereby, a laterally projecting yielding gage element mounted on the support, an indicating mechanism sustained by the support, means operated by the gage element for operating said indicating mechanism, and a member movable longitudinally on the support and provided with a bearing surface extending in a plane at right angles to the longitudinal axis of the support, said bearing surface adapted to coöperate with the end of the work in squaring the gage with the work.

3. In a gage, the combination of a body or support, fixed laterally projecting positioning stops carried thereby, a laterally projecting yielding gage element mounted on the support, an indicating mechanism operated by the gage element, a member movable longitudinally on the support and provided with a bearing surface extending at right angles to the axis of the support and adapted to coöperate with the work in squaring the gage with the same, and a longitudinally adjustable abutment carried by the support in position to be engaged by said longitudinally movable member.

4. In a gage, the combination of a body or support, fixed laterally projecting positioning stops carried thereby, a laterally projecting yielding gage element mounted on the support, an indicating mechanism sustained by the support, means operated by the gage element for operating said indicating mechanism, a sleeve loosely surrounding the body or support and movable longitudinally thereof, said sleeve being provided with a bearing surface extending at right angles to the axis of the support and adapted to coöperate with the ends of the work in squaring the gage with the work, and means for limiting the longitudinal movement of the sleeve on the support.

5. In a gage, the combination of a body or support, fixed laterally projecting stops carried thereby, a yielding gage element projecting laterally from the support, an indicating member sustained by the support, an operating lever extending longitudinally within the support and movable transversely thereof, said lever being connected respectively with the gage element and indicating mechanism to operate the latter, and means to locate the support in relation to the work being gaged.

6. In a gage, the combination of a body or support, fixed laterally projecting positioning stops carried by the support, a laterally extending yielding gage element mounted on the support and projecting therefrom at one end, an indicating mechanism at the opposite end of the support, including a member movable transversely of the axis of the support, an operating lever extending longitudinally with the support and pivoted thereto on a transverse axis, one end of said lever being engaged with the yielding gage element and the other end being engaged with the movable member of the indicating mechanism, and means to locate the support in relation to the work being gaged.

7. In a gage, the combination of a body or support, fixed laterally projecting positioning stops carried thereby, a laterally projecting yielding gage element mounted on the support, an indicating mechanism including means operated by the yielding gage element for operating the indicator, a member movable longitudinally of the support and provided with a bearing surface extending at right angles to the axis of the support and adapted to coöperate with the work in squaring the gage therewith, and an adjusting screw sustained by and extending longitudinally of the support and adapted to engage the movable member.

In testimony whereof, I have affixed my signature in presence of two witnesses.

FRED E. BRIGHT.

Witnesses:
W. R. KENNEDY,
WM. J. DOLAN.